(12) United States Patent
Kooijker et al.

(10) Patent No.: US 9,101,242 B2
(45) Date of Patent: Aug. 11, 2015

(54) SET OF ARTICLES WHICH ARE SUITABLE TO BE USED IN A PROCESS OF MAKING A BEVERAGE

(75) Inventors: Klaas Kooijker, Drachten (NL); Martijn Douwes, Drachten (NL); Gertrude Riette Van Der Kamp, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 779 days.

(21) Appl. No.: 12/919,030

(22) PCT Filed: Mar. 4, 2009

(86) PCT No.: PCT/IB2009/050871
§ 371 (c)(1),
(2), (4) Date: Aug. 24, 2010

(87) PCT Pub. No.: WO2009/109922
PCT Pub. Date: Sep. 11, 2009

(65) Prior Publication Data
US 2011/0000376 A1    Jan. 6, 2011

(30) Foreign Application Priority Data

Mar. 6, 2008  (EP) .................................... 08152363

(51) Int. Cl.
*A47J 31/00* (2006.01)
*A47J 31/44* (2006.01)
(Continued)

(52) U.S. Cl.
CPC .......... *A47J 31/0678* (2013.01); *A47J 31/0647* (2013.01); *A47J 31/0663* (2013.01);
(Continued)

(58) Field of Classification Search
CPC ..... A47J 31/56; A47J 31/005; A47J 31/0663; A47J 31/20; A47J 31/4403; A47J 31/007; A47J 31/02; A47J 31/06; B65D 85/8043; A47G 19/16
USPC ....... 99/283, 295, 279, 302 R, 287, 323, 284, 99/291, 306, 282, 298, 316
See application file for complete search history.

(56) References Cited

U.S. PATENT DOCUMENTS 4,888,466 A  * 12/1989 Hoffmann ..................... 392/444
5,316,781 A     5/1994 Lussi et al.
(Continued)

FOREIGN PATENT DOCUMENTS

CN         1794937 A    6/2006
CN       201551159 U    8/2010
(Continued)

*Primary Examiner* — Dana Ross
*Assistant Examiner* — Hemant Mathew

(57) ABSTRACT

A set of articles comprises a beverage making device (1), at least one pad holder which is suitable for receiving and supporting at least one pad comprising a filter envelope and containing a quantity of beverage extract, and at least one brewing unit (21) having a space (23) for receiving and accommodating a quantity of beverage extract in a loose form. Advantageously, the space (23) of the at least one brewing unit (21) is large enough for enabling the brewing unit (21) to be used in a process of making a considerably larger quantity of beverage than may be obtained by using at least one pad and a pad holder. In this way, it is achieved that it is possible to make a large variety of quantities of beverage without a need of using another beverage making device (1), wherein a range of possible quantities may run from one cup to an entire jug.

7 Claims, 7 Drawing Sheets

(51) Int. Cl.
  *A47J 31/06* (2006.01)
  *A47J 31/36* (2006.01)
  *B65D 85/804* (2006.01)

(52) U.S. Cl.
  CPC ............ *A47J31/368* (2013.01); *A47J 31/3671* (2013.01); *A47J 31/005* (2013.01); *A47J 31/4403* (2013.01); *B65D 85/8043* (2013.01)

(56) References Cited

U.S. PATENT DOCUMENTS

| | | | |
|---|---|---|---|
| 6,035,762 A * | 3/2000 | Ruckstuhl | 99/295 |
| 6,401,985 B1 * | 6/2002 | DeMars | 222/209 |
| 6,481,338 B1 | 11/2002 | Wai | |
| 6,772,676 B2 | 8/2004 | Lassota | |
| 7,017,474 B2 | 3/2006 | Comte | |
| 7,163,126 B2 | 1/2007 | Knepler | |
| 2004/0107841 A1 * | 6/2004 | Cai | 99/302 R |
| 2005/0034605 A1 * | 2/2005 | Webster et al. | 99/279 |
| 2006/0102008 A1 * | 5/2006 | Lin | 99/279 |
| 2006/0150823 A1 * | 7/2006 | Thomas | 99/279 |
| 2006/0225577 A1 * | 10/2006 | Mulder et al. | 99/279 |
| 2006/0266222 A1 * | 11/2006 | Hammad | 99/279 |
| 2006/0266224 A1 * | 11/2006 | Hammad et al. | 99/279 |
| 2006/0283332 A1 * | 12/2006 | Garman | 99/279 |
| 2007/0062378 A1 * | 3/2007 | Glucksman et al. | 99/279 |
| 2007/0175338 A1 * | 8/2007 | Glucksman et al. | 99/279 |
| 2007/0221069 A1 * | 9/2007 | Rahn et al. | 99/323 |
| 2011/0000376 A1 | 1/2011 | Kooijker et al. | |

FOREIGN PATENT DOCUMENTS

| | | | |
|---|---|---|---|
| WO | 2004105564 A1 | 12/2004 | |
| WO | 2004112556 A1 | 12/2004 | |
| WO | 2005046408 A1 | 5/2005 | |
| WO | 2005053485 A1 | 6/2005 | |
| WO | 2005099534 A1 | 10/2005 | |
| WO | WO 2005099534 A1 * | 10/2005 | A47J 31/06 |

\* cited by examiner

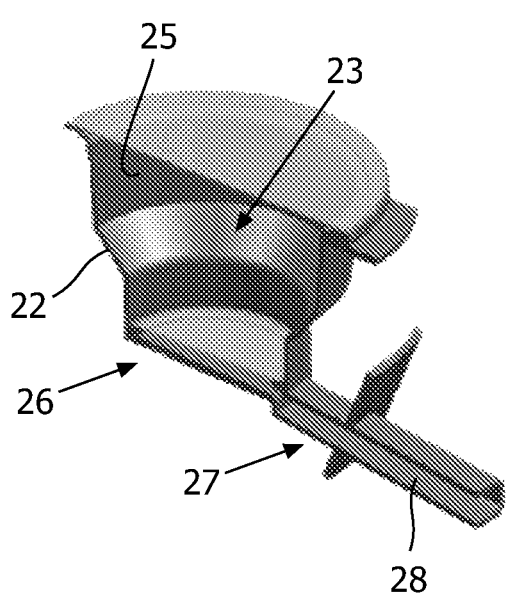
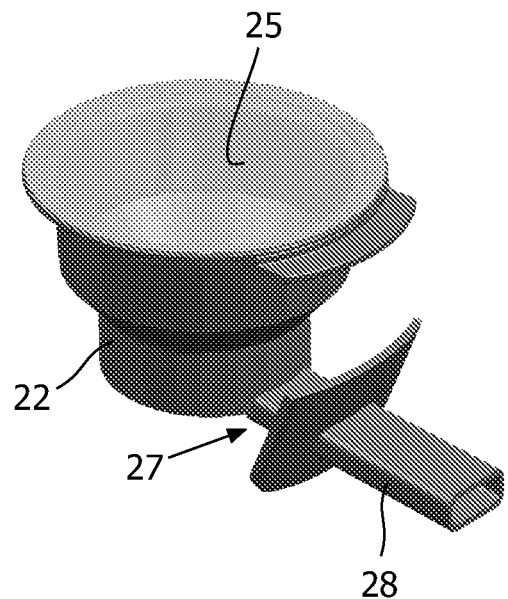
FIG. 8　　　　FIG. 9
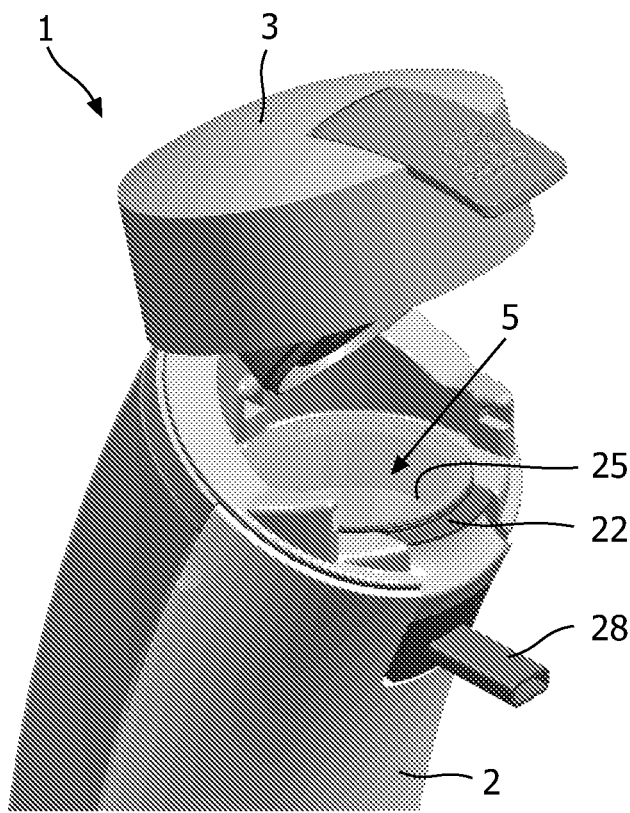
FIG. 10

SET OF ARTICLES WHICH ARE SUITABLE TO BE USED IN A PROCESS OF MAKING A BEVERAGE

FIELD OF THE INVENTION

The present invention relates to a set of articles which are suitable to be used in a process of making a beverage by conducting a fluid through a beverage extract, comprising:

a beverage making device having a brewing space for at least partially receiving and accommodating a device for holding a quantity of beverage extract, and a single system for conducting and pumping fluid through the beverage making device; and a number of devices for holding a quantity of beverage extract, in particular at least one pad holder having a relatively shallow space, which is suitable for receiving and supporting at least one pad comprising a filter envelope and containing a quantity of beverage extract, and which is suitable to be arranged in the brewing space of the beverage making device.

BACKGROUND OF THE INVENTION

A set of articles which are suitable to be used in a process of making a beverage by conducting a fluid through a beverage extract, comprising a beverage making device having a brewing space and a system for conducting and pumping fluid through the beverage making device, and at least one pad holder is known. For example, WO 2005/053485 discloses a device for making a beverage such as coffee, wherein the device comprises a brewing chamber for enclosing one or more pads containing a substance from which the beverage is to be brewed, and a lid that can be lowered to close the brewing chamber and that can be lifted to open the brewing chamber. Furthermore, WO 2005/053485 discloses the use of different removable parts, wherein each removable part serves for forming a lower wall of the brewing chamber of the beverage making device. One of the removable parts is designed to contain and support one pad containing a substance to be extracted, and another of the removable parts is designed to contain and support two of such pads.

The beverage making device known from WO 2005/053485 is only intended to be used for making relatively small quantities of beverage. When the removable part for containing one pad is used, a quantity which is suitable to fill one cup is obtained, and when the removable part for containing two pads is used, a quantity which is suitable to fill two cups or one large mug is obtained. On the basis of this fact, users prefer to use another type of beverage making device when it is necessary to make a larger quantity of beverage, for example when having a birthday party, otherwise it is necessary to spend a lot of time with the beverage making device in order to fill the required amount of cups. Therefore, users may decide to have two beverage making devices, but in such a case, they need to put up with a drawback of the occupation of extra space in the kitchen. Alternatively, users may decide to have only one beverage making device. On the one hand, when the user chooses to have a device as known from WO 2005/053485, problems arise when there is a need for a quantity of beverage which is larger than a quantity for filling two cups. On the other hand, when the user chooses to have another device, for example a conventional drip-filter coffee appliance, the advantages of using a device as known from WO 2005/053485 when it is only necessary to make one or two cups of a beverage are missed.

In general, according to the prior art, in one beverage making device, it is only possible to have a combination of the convenience of using pads for a beverage making process with obtaining a relatively small quantity of the beverage or to have a combination of the inconvenience of providing beverage extract in a more bothersome way than by simply using pads with obtaining a quantity as desired, wherein this quantity may be considerably larger than just a quantity of two cups. It is clear that in either case, there is a drawback.

SUMMARY OF THE INVENTION

It is an object of the present invention to solve the above-mentioned problem, i.e. the problem which resides in the fact that a beverage making device which is suitable for processing pads is not capable of making a relatively large quantity of beverage during one operation cycle. This object is achieved by providing a set of articles as mentioned in the opening paragraph, i.e. a set of articles comprising a beverage making device having a brewing space and a single system for conducting and pumping fluid through the beverage making device; and a pad holder having a relatively shallow space; wherein the set of articles further comprises at least one brewing unit having a space which is suitable for receiving and accommodating a quantity of beverage extract in a loose form, wherein the brewing unit comprises at least one filter element, wherein at least a part of the brewing unit is suitable to be arranged in the brewing space of the beverage making device, and wherein the space of the at least one brewing unit is larger than the space of the at least one pad holder.

According to the present invention, for the purpose of performing a beverage making process, a beverage making device is used in combination with one of two different types of a device for holding a quantity of beverage extract. One type of the device for holding a quantity of beverage extract is a pad holder, i.e. a device having a relatively shallow space, which is suitable for receiving and supporting at least one pad comprising a filter envelope and containing a quantity of beverage extract, and which is suitable to be arranged in the brewing space of the beverage making device. The pad holder is typically suitable to be applied when it is desired to make only a relatively small quantity of beverage by using at least one pad. Another type of the device for holding a quantity of beverage extract is a brewing unit, i.e. a device having a space for receiving and accommodating a quantity of beverage extract in a loose form, which device comprises at least one filter element, and which is suitable to be at least partly arranged in the brewing space of the beverage making device. The brewing unit is typically suitable to be applied when it is desired to make a relatively large quantity of beverage by using a beverage extract in a loose form.

For sake of completeness, it is noted that a filter element is a commonly known element which is capable of letting through a liquid but blocking particles. The filter element may comprise filter paper, or may be a more durable type of filter element, for instance, a filter element manufactured from plastic or metal, which is provided with a number of tiny holes, wherein a shape and a pattern of such holes may be chosen freely. In general, in a design of a filter element, requirements regarding a maximum allowable pressure drop of a flow of liquid need to be taken into account, besides requirements regarding a size of particles to be blocked by the filter element.

In view of the fact that the brewing unit has at least one filter element, it is possible to use beverage extract in a loose form, i.e. without an envelope surrounding it, in the brewing unit, which does not alter the fact that in principle, it is also possible for the brewing unit to be filled with one or more items which comprise some type of filter envelope or soluble envelope enclosing a quantity of beverage extract.

It is noted that a possibility of using various devices for holding a quantity of beverage extract in a device for making a beverage is known from US 2004/0107841. Among other things, US 2004/0107841 teaches that a coffee cartridge or pad can be replaced by a filter basket, or by a filter which may be permanent or disposable, for receiving loose coffee grounds. Furthermore, WO 2005/099534 discloses that a variety of brewing devices might include a clam shell type of pad holder, as well as an espresso-type beverage holder. US 2005/0034605 discloses the use of a clam shell type of pad holder, wherein a scoop having a filter at the bottom may be inserted in the pad holder. In none of the known cases, however, it is possible to brew a great variety of quantities of beverage. According to the state of the art, limitations as to the quantities of beverage to be brewed caused by the dimensions of a brewing space are taken for granted. The present invention is based on an insight that various quantities of beverage can be made in one and the same beverage making device by using different devices for holding a quantity of beverage extract, wherein the dimensions of a space of one or more of the devices can even be considerably larger than the seemingly fixed dimensions of the brewing space, and it is an important achievement of the present invention that actual ways for making the various quantities of beverage are provided, as will be further explained in the following.

Preferably, both the at least one pad holder and the at least one brewing unit are suitable to be covered by the closure means of the beverage making device, which may be a hingeably arranged lid, for example. When the set of articles according to the present invention is applied, it is very easy for a user to adapt the functionality of a beverage making device to a desired quantity of beverage to be made, as this is done by taking care that an appropriate device for holding a quantity of beverage extract is applied and is properly filled. Furthermore, there is no need for a more complicated beverage making device than a known beverage making device which is adapted to process pads, and the beverage making device does not need to have more than one system for conducting and pumping a fluid such as water through the beverage making device. Hence, it is an achievement of the present invention that it is possible to have a set of articles comprising a single beverage making device, at least one pad holder which may be used with the beverage making device, and at least one brewing unit which may be used with the beverage making device, by means of which various quantities of beverage may be made, both relatively small and relatively large, depending on which one of the pad holder and the brewing unit is applied. Another advantageous aspect of the present invention is the fact that the convenient possibility of using pads for making a relatively small quantity of beverage is maintained.

According to the present invention, the space of the at least one brewing unit is larger than the space of the at least one pad holder, so that it is possible to use the brewing unit for the purpose of making a relatively large quantity of beverage, indeed, wherein the dimensions of the brewing unit may even be such that it is not possible to place the entire brewing unit in the brewing space of the beverage making device. In case the closure means of the beverage making device comprise a hingeably arranged lid, the brewing unit may be shaped and dimensioned such as to be suitable to be covered by the lid in another hinged position than a position for closing the open side of the brewing space of the beverage making device. In fact, when this brewing unit is applied, the brewing space of the beverage making device is enlarged, so that it is possible to use a larger quantity of a fluid such as water for making a larger quantity of beverage.

Advantageously, two filter elements are used in combination with the at least one brewing unit, namely one filter element which is arranged at a side of the brewing unit where the fluid is to be let in during a beverage making process, and another filter element which is arranged at a side of the brewing unit where freshly made beverage is to be let out. It is not necessary that both filter elements are part of the brewing unit, as it is also possible that one filter element is arranged in the beverage making device, for instance, in the closure means of the beverage making device. An advantage of this possibility is that a user may fill the brewing unit with a beverage extract through an open side, wherein this open side is closed as soon as the brewing unit is put in place in the beverage making device and the closure means are put to a position for covering the brewing unit. Hence, there is no need for the user to take care of closing the brewing unit manually. With respect to the filter elements, it is furthermore noted that these elements may be removably arranged for the purpose of convenient cleaning.

The beverage making device may be equipped with means for controlling the operation of the system for conducting and pumping fluid through the beverage making device, and means for detecting the type of device for holding a quantity of beverage extract when such a device is placed in the beverage making device, i.e. means for detecting whether a pad holder or a brewing unit is placed in the beverage making device, wherein the detecting means are adapted to transmit information regarding the type of device for holding a quantity of beverage extract to the controlling means. In that case, an appropriate value of a quantity of fluid to be conducted and pumped through the beverage making device, and other parameters such as a flow rate of the fluid, a contact time between the fluid and the beverage extract and/or a brewing pressure may be determined in an automatic manner. However, it is also possible that the beverage making device is provided with at least one extra element to be operated by a user, so that information regarding the type of device for holding a quantity of beverage extract is input in a manual manner.

The set of articles according to the present invention may comprise two of at least one type of device for holding a quantity of beverage extract, wherein the beverage making device is equipped with two different elements to be operated by a user, wherein one element is arranged in a system for supplying a first signal to the controlling means, and wherein another element is arranged in a system for supplying a second signal to the controlling means, wherein the first signal is associated with a first quantity of fluid to be used in a beverage making process, wherein the second signal is associated with a second quantity of fluid to be used in a beverage making process, and wherein the first quantity and the second quantity are different quantities. For example, the set of articles may comprise two pad holders and two brewing units, wherein one pad holder is suitable to be used in a process of making one cup of beverage during one operation cycle, wherein another pad holder is suitable to be used in a process of making two cups of beverage during one operation cycle, wherein one brewing unit is suitable to be used in a process of making six to eight cups of beverage during one operation cycle, and wherein another brewing unit is suitable to be used in a process of making fourteen to sixteen cups of beverage during one operation cycle. In such a case, it is convenient to have two elements for determining whether a first quantity of fluid or a second quantity of fluid needs to be used in a beverage making process. One of the quantities may be twice as large as another of the quantities, although other relations of the quantities are possible as well within the scope of the present invention.

It is noted that the beverage making device may be provided with a tank for containing the fluid to be used in a beverage making process. In view of the fact that there may be quite a difference between the quantities of fluid to be used with a pad holder or a brewing unit, the set of articles according to the invention may further comprise two tanks for containing fluid, wherein the beverage making device has an area for receiving one of the tanks, and wherein the tanks are of different size.

Besides to the above-described set of articles, the present invention also relates to a brewing unit as described, i.e. a brewing unit which is suitable to be at least partly arranged in a brewing space of a beverage making device, which has a space which is suitable for receiving and accommodating a quantity of beverage extract in a loose form, which comprises at least one filter element, which is suitable to be covered by closure means of the beverage making device, i.e. means for closing an open side of the brewing space of the beverage making device, and which further comprises means which are suitable for engagement with a portion of the closure means of the beverage making device, so that a side of the brewing unit may be closed and sealed by these closure means.

Furthermore, a beverage making device may have a brewing space for at least partially receiving and accommodating a device for holding a quantity of beverage extract, a single system for conducting and pumping fluid through the beverage making device, means for controlling the operation of the system for conducting and pumping fluid through the beverage making device, and means for detecting the type of device for holding a quantity of beverage extract when such a device is placed in the beverage making device, wherein the detecting means are adapted to transmit information regarding the type of device for holding a quantity of beverage extract to the controlling means. In this way, an appropriate process of operating the beverage making device may be chosen automatically, wherein there is no need for a user of the beverage making device to provide input regarding the type of device for holding a quantity of beverage extract, so that mistakes may be avoided.

The beverage making device may further comprise valve means which are controllable by the means for controlling the operation of the system for conducting and pumping fluid through the beverage making device, and which are adapted to let in air to the brewing space of the beverage making device when being in an opened position. In a beverage making device having the valve means as mentioned, it is possible to eliminate a difference between a pressure prevailing in the brewing space of the beverage making device and the ambient pressure, which may have a number of advantageous effects, including facilitating opening the brewing space of the beverage making device after a beverage making process has taken place.

The above-described and other aspects of the present invention will be apparent from and elucidated with reference to the following description of a set of articles according to the present invention, wherein the articles of this set are suitable to be used in a process of making a beverage by conducting a fluid through a beverage extract.

BRIEF DESCRIPTION OF THE DRAWINGS

The present invention will now be explained in greater detail with reference to the figures, in which equal or similar parts are indicated by the same reference signs, and in which:

FIG. 8 is a perspective view of a second embodiment of a brewing unit to be used with the beverage making device;

FIG. 9 is a perspective sectional view of the brewing unit as shown in FIG. 8;

FIG. 10 is a perspective view of the second embodiment of the brewing unit and an upper part of the beverage making device, wherein the brewing unit is put in place in the beverage making device, and wherein the lid of the device is in an opened position.

DETAILED DESCRIPTION OF EMBODIMENTS

Figure 1:
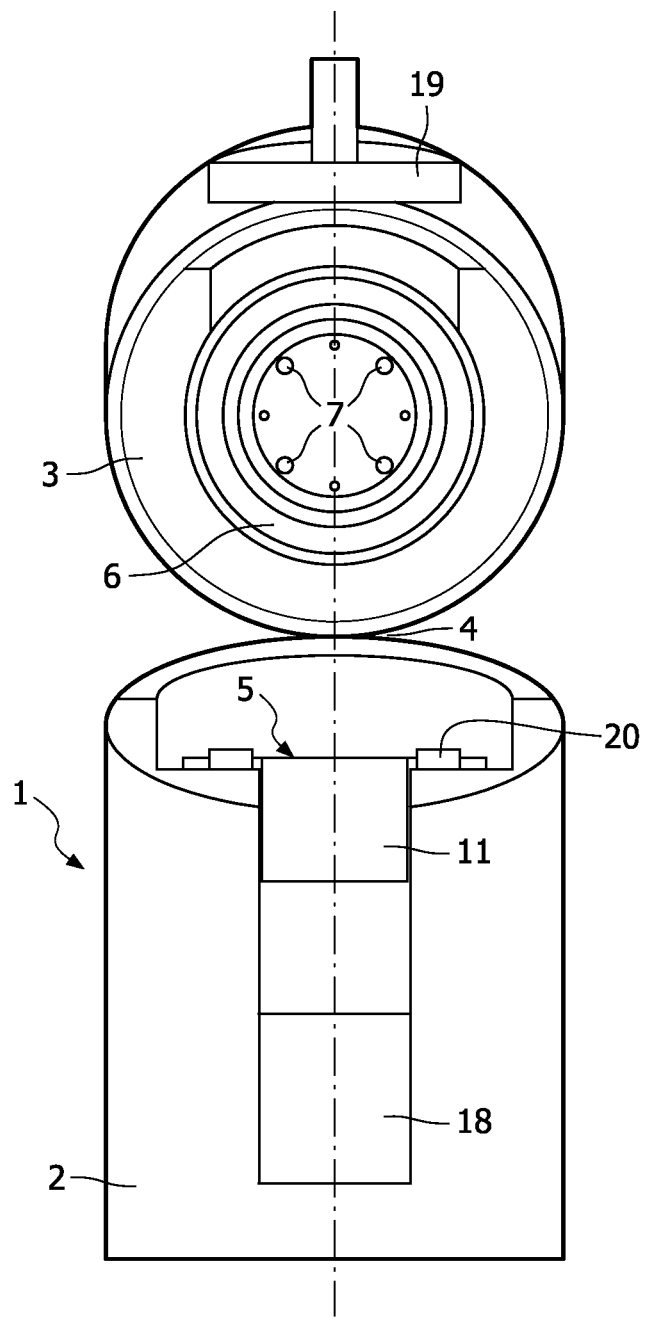
FIG. 1 is a front view of an upper part of a beverage making device and a pad holder which is positioned in the device.
Figure 2:
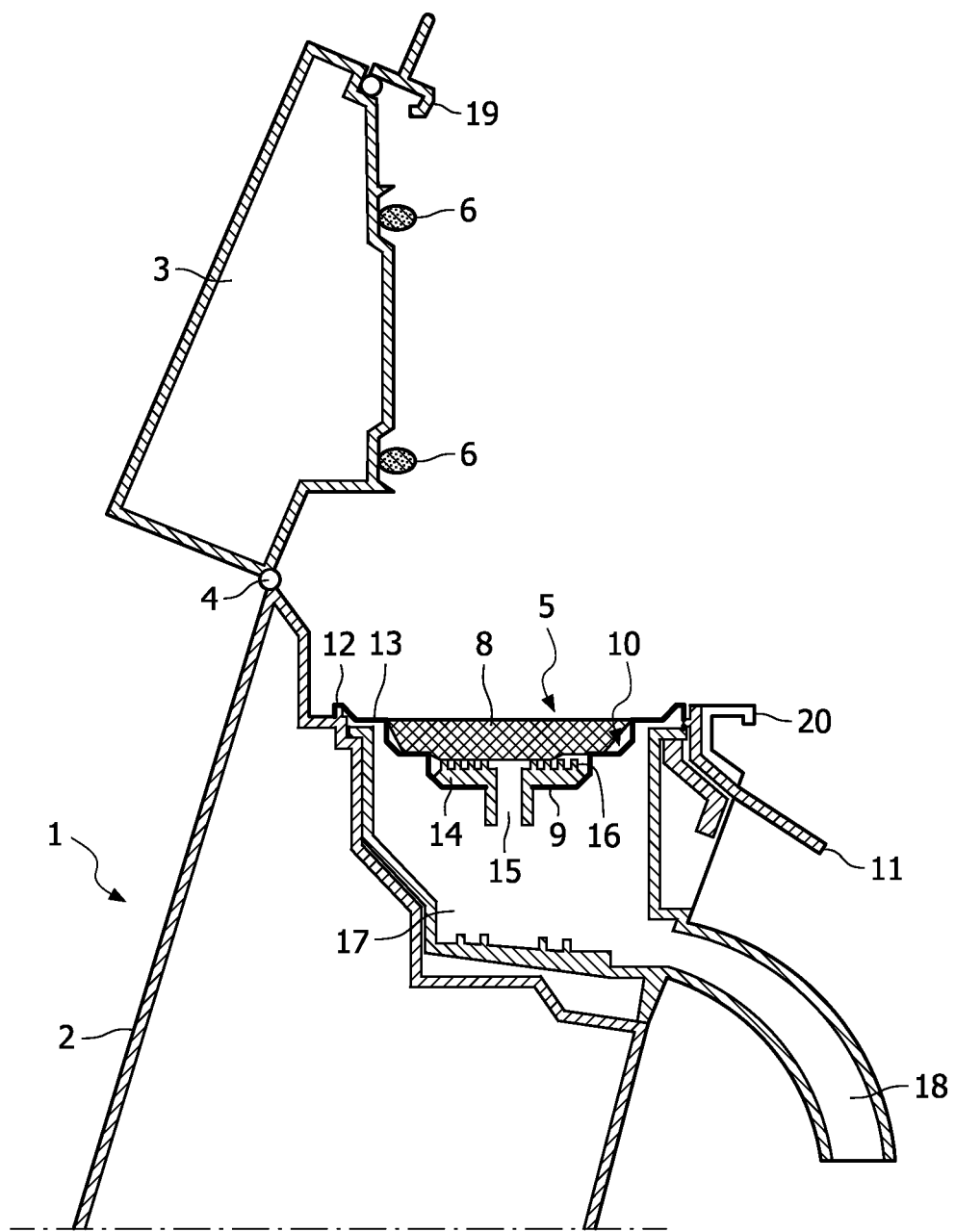
FIGS. 2 and 3 are sectional views of the beverage making device as shown in FIG. 1 and the pad holder which is positioned in the device, for two different positions of a lid of the device.
Figure 3:
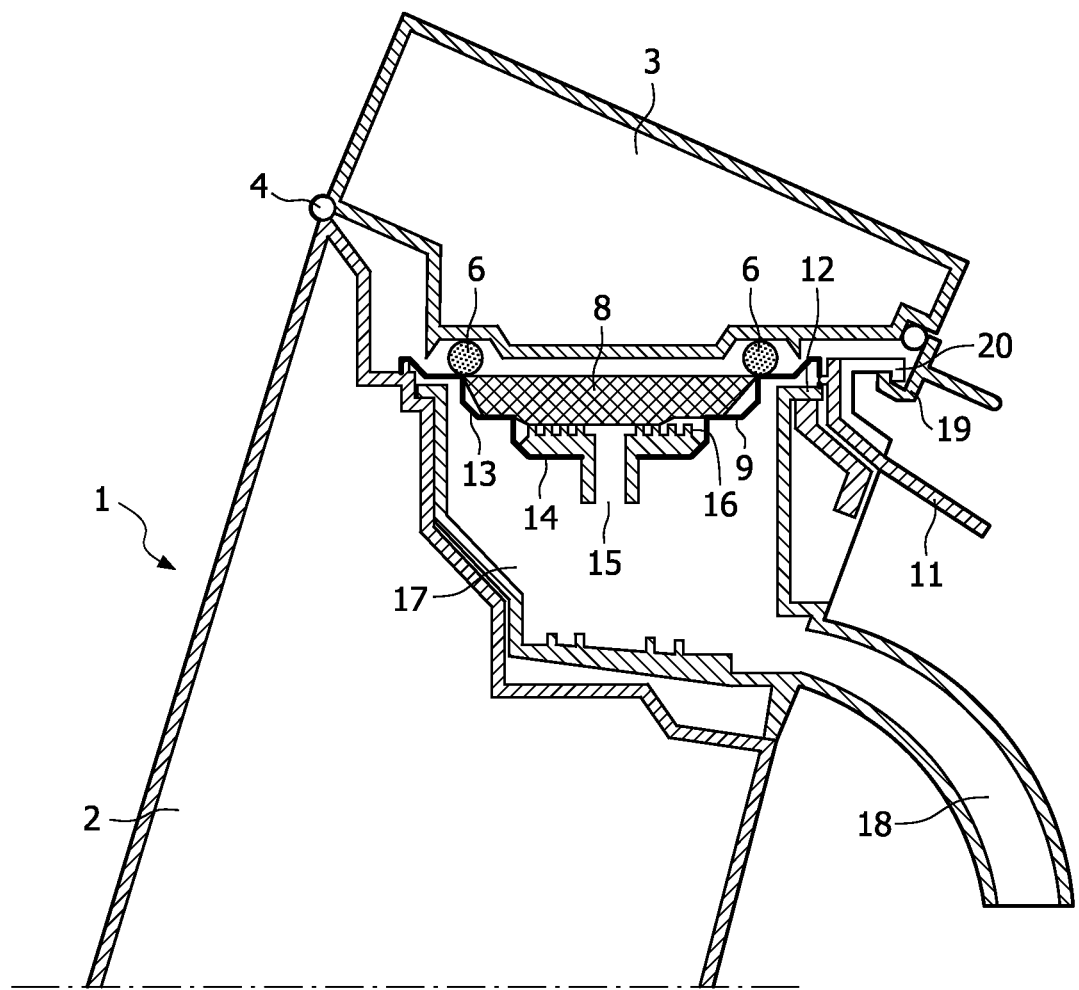
Figure 4:
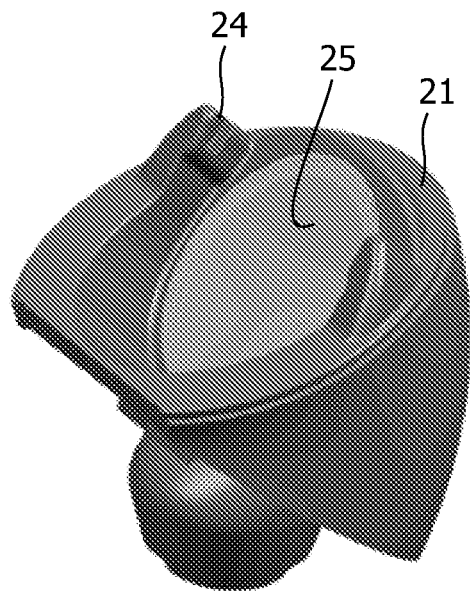
FIG. 4 is a perspective view of a first embodiment of a brewing unit to be used with the beverage making device.
Figure 5:
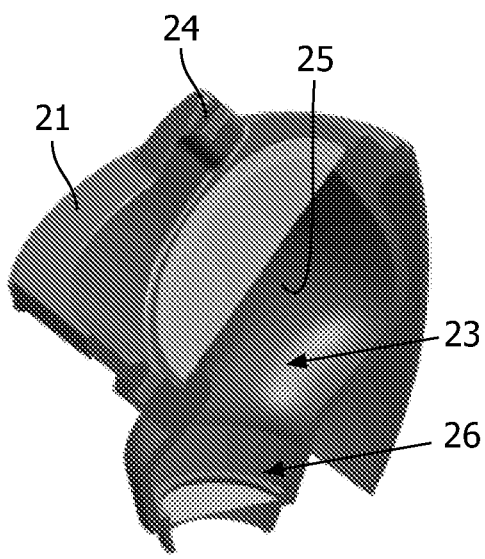
FIG. 5 is a perspective sectional view of the brewing unit as shown in FIG. 4.
Figure 7:
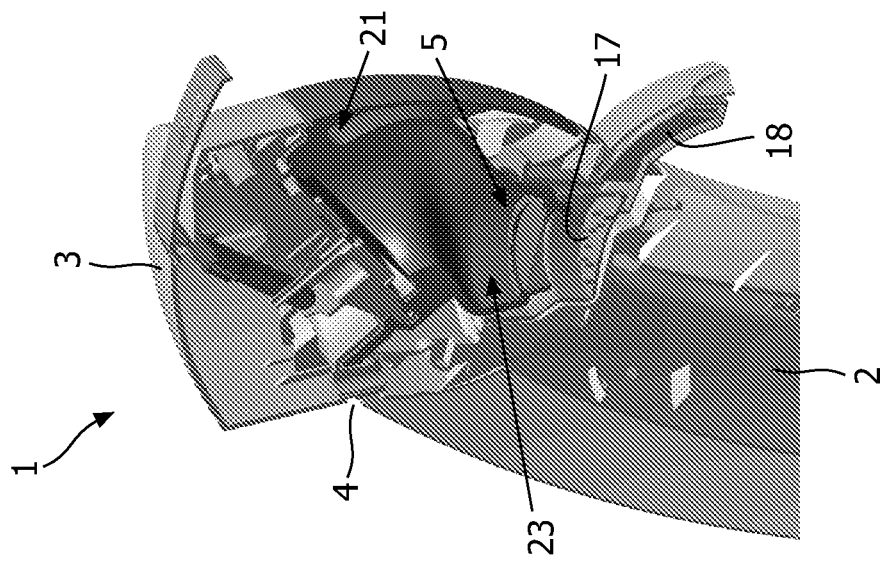
FIG. 7 is a perspective sectional view of the brewing unit and the upper part of the beverage making device as shown in FIG. 6.

FIGS. 1-3 show an upper part of a beverage making device 1, which comprises a base part 2 and a hinging part 3, wherein the hinging part 3 is connected to the base part 2 in a hinging fashion, and wherein the hinging part 3 is movable between a position for closing a top side of the base part 2 and positions for leaving the top side of the base part 2 open. In particular, the hinging part 3 is hingeable about a shaft 4. It is noted that FIGS. 1 and 2 show the hinging part 3 in an opened position, and that FIG. 3 shows the hinging part 3 in a closed position.

The beverage making device 1 as shown is particularly suitable for making coffee, and will therefore hereinafter be referred to as coffee maker 1, wherein the beverage to be made will be denoted as being coffee, wherein the extract to be used in the process will be denoted as being ground coffee beans, and wherein the fluid to be used in the process will be denoted as being water. That does not alter the fact that the beverage making device 1 as shown is also suitable for making other types of beverage such as tea, for example. Furthermore, that does not alter the fact that the present invention is applicable with various types of beverage making devices, including beverage making devices which are not particularly suitable for making coffee.

Inside the base part 2 of the coffee maker 1, a brewing space 5 is present. In general, this space 5 serves for accommodating a quantity of ground coffee beans, wherein an additional device for containing and supporting such a quantity is used, as will be explained later. When a coffee making process is performed, hot water is made to flow through the brewing space 5, so that the coffee is obtained on the basis of an interaction of the hot water and a quantity of ground coffee beans that is present inside the brewing space 5. For the purpose of sealing a top side of the brewing space 5 when the hinging part 3 is in a closed position, a sealing ring 6, which is preferably made of a flexible material, is arranged at a bottom side of the hinging part 3. Furthermore, holes 7 for supplying water to the brewing space 5 in the closed position of the hinging part 3 are arranged in the bottom side of the hinging part 3.

The coffee maker 1 further comprises a water tank for containing water to be used in a coffee making process, a system for conducting the water through the coffee maker 1, a pump for pressurizing the water, and means such as a boiler or a flow-through heater for heating the water. These components of the coffee maker 1 may be conventional components, wherein the present invention does not require an amendment of the design of these components and the way in which they are operable. Furthermore, these components are not shown in FIGS. 1-3.

According to the present invention, the coffee maker 1 is suitable for processing both coffee pads, i.e. pads comprising a filter envelope and containing a quantity of ground coffee beans, and ground coffee beans in a loose form, depending on a choice of a user of the coffee maker 1. In FIGS. 2 and 3, one coffee pad 8 is shown, as well as a sectional view of a pad holder 9 which is used for keeping the coffee pad 8 in place in the brewing space 5. For the purpose of receiving and accommodating the coffee pad 8, the pad holder 9 has a shallow space 10. Furthermore, the pad holder 9 comprises a handle 11 to facilitate its handling by a user, so that it is easy for a user to remove the pad holder 9 from the brewing space 5, for cleaning purposes and/or pad replacement purposes, and also to put the pad holder 9 in place in the base part 2. It is noted that the coffee maker 1 as shown may also be used for processing two coffee pads 8 at a time, and that another pad holder (not shown) having a larger space, which is adapted to receive and accommodate a stack of two coffee pads 8 belongs to a set of devices which are suitable to be used with the coffee maker 1.

In the shown example, the pad holder 9 is designed to rest on a supporting ring 12 which is present at the top side of the brewing space 5. Furthermore, in the shown example, the pad holder 9 comprises a metal part 13 and a plastic part 14 which is attached to the metal part 13, and which has a central outlet opening 15. At a top side, the plastic part 14 is provided with a number of protrusions 16 for supporting the coffee pad 8 and for creating space, so that freshly brewed coffee may be conducted between the protrusions 16 on its way toward the outlet opening 15.

When the pad holder 9 and a coffee pad 8 are put in place in the base part 2 of the coffee maker 1, and the hinging part 3 is put to a closed position, the brewing space 5 is closed, except for the holes 7 which are present in a bottom side of the hinging part 3, and the outlet opening 15 which is present in the pad holder 9. When the coffee maker 1 is activated, water is heated and pressurized, and is supplied to the brewing space 5 through the holes 7. The water passes through the coffee pad 8, as a result of which coffee is made, which exits the brewing space 5 through the outlet opening 15. The freshly brewed coffee is let out to a chamber 17 in which the coffee is collected, and subsequently leaves the coffee maker 1 through an outlet tube 18. For the purpose of keeping the hinging part 3 of the coffee maker 1 in the closed position when the pressurized water is supplied to the brewing space 5, the hinging part 3 is provided with a latch 19, which is adapted to engage an edge 20 of the base part 2.

By making coffee on the basis of one or two coffee pads 8, a relatively small quantity of coffee is obtained, namely a quantity which is suitable for filling one or two cups, or a larger mug. In order to enable the coffee maker 1 to make a larger quantity of coffee if so desired, other additional devices than pad holders 9 are provided, namely brewing units 21, 22 as shown in FIGS. 4-10, wherein a first embodiment of the brewing unit 21 is shown in FIGS. 4-7 and will hereinafter be referred to as first brewing unit 21, and wherein a second embodiment of the brewing unit 22 is shown in FIGS. 8-10 and will hereinafter be referred to as second brewing unit 22.

Figure 6:
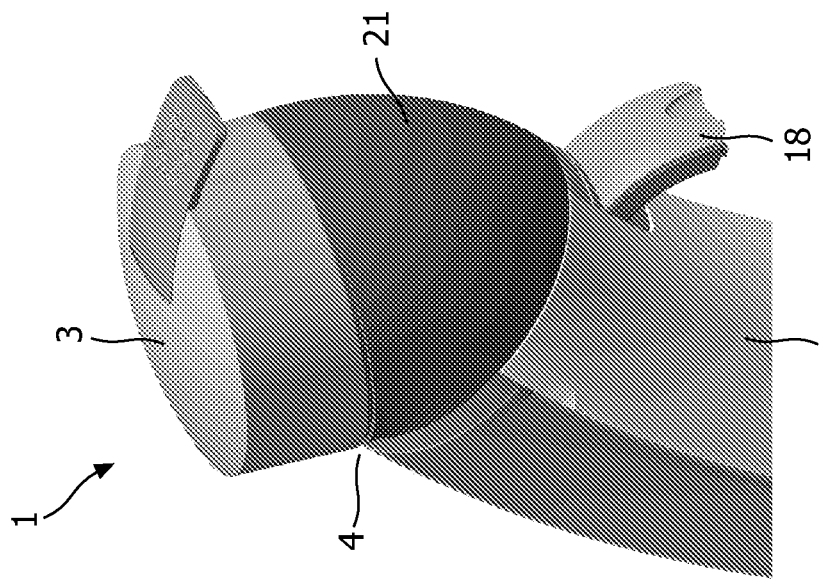
FIG. 6 is a perspective view of the first embodiment of the brewing unit and an upper part of the beverage making device, wherein the brewing unit is put in place in the beverage making device.

The first brewing unit 21 comprises a space 23 for receiving and containing a quantity of ground coffee beans in a loose form, which space 23 is considerably larger than the shallow space 10 which is present in the pad holder 9 for receiving and containing a coffee pad 8. The space 23 of the first brewing unit 21 is so large, that it is not possible for the entirety of the unit 21 to fit in the brewing space 5 of the coffee maker 1. However, it is still possible to use the first brewing unit 21 with the coffee maker 1, as a bottom part of the first brewing unit 21 is adapted to fit in the brewing space 5, and a top part of the first brewing unit 21 is adapted to fit in a space which is present between the top side of the base part 2 and the bottom side of the hinging part 3 when the hinging part 3 is in an orientation that is associated with an opened position, as is clearly shown in FIGS. 6 and 7. Hence, in a side view as shown in FIG. 6, the first brewing unit 21 has a shape such as to be tapering toward the shaft 4 about which the hinging part 3 is hingeable.

At a top side, the first brewing unit 21 comprises a connection element 24 which is suitable for engagement with the latch 19 of the hinging part 3, so that the top side may be closed and sealed by the hinging part 3. Furthermore, the shape of the first brewing unit 21 at the top side is adapted to receive the sealing ring 6 of the hinging part 3, such that the sealing ring 6 may perform a sealing function in the same way as with a pad holder 9. Therefore, it is possible to perform the coffee making process under pressure, so that the size of the first brewing unit 21 may be kept within acceptable limits, and the time to make the entire quantity of water may be shorter than in non-pressure conditions.

The first brewing unit 21 as shown comprises two filter elements 25, 26, wherein one filter element 25 is positioned at a side of the first brewing unit 21 which is a top side in a functional orientation of the unit 21, and wherein another filter element 26 is positioned at a side of the first brewing unit 21 which is a bottom side in the functional orientation. Each of the filter elements 25, 26 is provided with holes (not shown) which are so small that most or all of the coffee particles can not pass these holes, whereas the holes are large enough for letting through water and coffee. In this way, the top filter element 25 serves for preventing pollution of the components involved in the hot water supply by coffee particles, and the bottom filter element 26 serves for preventing coffee particles from ending up in the receptacle for receiving the coffee from the coffee maker 1.

When the first brewing unit 21 and a quantity of ground coffee beans are used, it is possible to make a quantity of coffee which is considerably larger than when a pad holder 9 and coffee pads 8 are used. For example, the first brewing unit 21 may be used for obtaining a quantity of coffee which resembles fourteen to sixteen cups during one operation cycle. Therefore, the first brewing unit 21 may be applied for the purpose of filling a jug.

At least one of the filter elements 25, 26 of the first brewing unit 21 may be removably arranged in order to enable emptying and filling of the space 23 of the unit 21. A removable arrangement of at least one of the filter elements 25, 26 may also facilitate cleaning of the unit 21.

When the first brewing unit 21 is used, a relatively large quantity of hot water needs to be supplied. To this end, it may be desirable to have a water tank which is larger than a water tank that is suitable to be used when only a smaller quantity of water is needed, i.e. when a pad holder 9 is used.

The second brewing unit 22 as shown in FIGS. 8-10 is comparable to the first brewing unit 21 as described in the foregoing. However, an important difference between the two brewing units 21, 22 resides in the fact that the space 23 of the second brewing unit 22 is smaller than the space 23 of the first brewing unit 21. In particular, the space 23 of the second brewing unit 22 is small enough for the entire unit 22 to be positioned in the brewing space 5 of the coffee maker 1, wherein it is possible for the hinging part 3 to close the base part 2 with the second brewing unit 22 in an orientation which is the same as the orientation in the position for closing the base part 2 with a pad holder 9. For example, the second brewing unit 22 may be used for obtaining a quantity of coffee which resembles six to eight cups during one operation cycle.

The second brewing unit 22 as shown comprises an outlet section 27 having an outlet tube 28 which serves for replacing the coffee collection chamber 17 and the outlet tube 18 of the coffee maker 1. The outlet tube 18 has a straight shape so that there is enough room for a coffee jug to be placed beside the base part 2 of the coffee maker 1.

Figure 11:
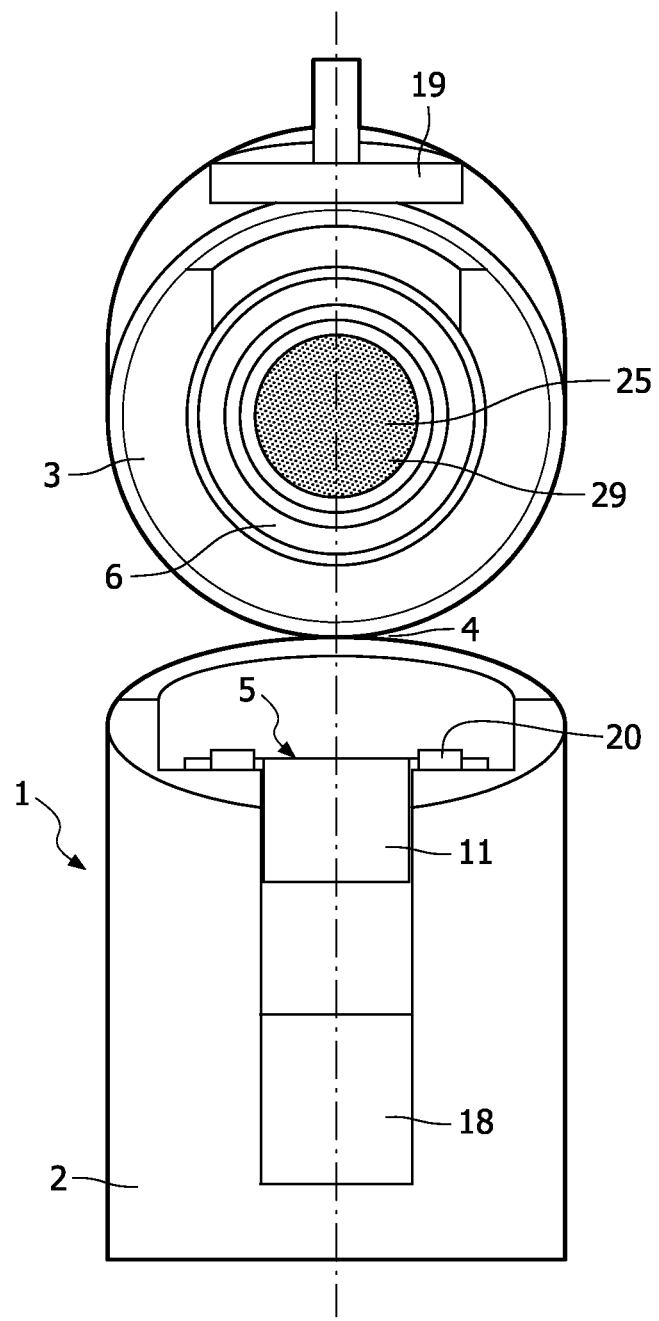
FIG. 11 is a front view of an upper part of a beverage making device comprising a filter element, and a pad holder which is positioned in the device.

It is not necessary for the filter elements 25, 26 to be incorporated in a brewing unit 21, 22. For example, it is possible to have a filter element 25 arranged at the bottom side of the hinging part 3 of the coffee maker 1, as shown in FIG. 11. In such a case, when the coffee maker 1 is operated, hot water is supplied to the space 10 of the pad holder 9 or the space 23 of the brewing unit 21, 22 through the tiny holes 29 of the filter element 25.

When a user has at his/her disposal the coffee maker 1, a pad holder 9 for containing and supporting one coffee pad 8, a pad holder 9 for containing and supporting two coffee pads 8, and brewing units 21, 22 having relatively large spaces 23 for containing a quantity of ground coffee beans in a loose form, the user may choose freely the quantity of coffee to be made, varying from one cup to a complete jug, wherein it is possible to use one and the same coffee maker 1. This is an important achievement of the present invention.

In a practical embodiment, the coffee maker 1 may comprise a microcontroller (not shown) or the like for controlling its operation. It is known per se to have two buttons for enabling a user to provide appropriate input to the microcontroller regarding the quantity of coffee that should be made. The coffee maker 1 as shown and described in the foregoing, which is suitable to be used with one of two pad holders 9 and two brewing units 21, 22, depending on a choice of a user, does not need to have more buttons, although it is possible to have four buttons, wherein each button is associated with the use of one of the said devices 9, 21, 22. In the first place, it is possible to have a third button, which determines a choice of pad holder 9 on the one hand and brewing unit 21, 22 on the other hand. In such a case, it is necessary for the user to press two buttons for setting the right quantity of coffee to be made. In the second place, it is possible to have detecting means for automatically detecting which type of device 9, 21, 22 is placed in the base part 2 of the coffee maker 1 at a given time. In such a case, the user only needs to press a button in order to choose between a larger quantity of coffee and a smaller quantity of coffee.

Within the scope of the present invention, the coffee maker 1 may comprise any suitable type of means for enabling a user to provide input to means for controlling its operation. In particular, it may be desirable to provide a user with a possibility of setting a contact time, as this is an important factor in determining the taste of the coffee.

The coffee maker 1 may comprise a controllable valve or the like (not shown) for letting in air to the brewing space 5 when a quantity of hot water has passed and the flow of water is terminated. Letting in air at that point helps for taking the pressure prevailing inside the brewing space 5 to a normal (ambient) level, as a result of which a last quantity of coffee, which would otherwise stay behind in the brewing space 5 until a user puts the hinging part 3 to an opened position, is allowed to exit the brewing space 5. Furthermore, when the pressure prevailing inside the brewing space 5 is made to more or less equal ambient pressure, it is much easier for a user to actually put the hinging part 3 to an opened position, as in that case, there are no or only small pressure differences between an interior side and an exterior side of the hinging part 3.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, a set of articles has been disclosed, comprising a beverage making device 1, at least one pad holder 9 having a relatively shallow space 10, which is suitable for receiving and supporting at least one pad 8 comprising a filter envelope and containing a quantity of beverage extract, and at least one brewing unit 21, 22 having a space 23 for receiving and accommodating a quantity of beverage extract in a loose form. Advantageously, the space 23 of the at least one brewing unit 21, 22 is large enough for enabling the brewing unit 21, 22 to be used in a process of making a considerably larger quantity of beverage than may be obtained by using at least one pad 8 and a pad holder 9. In this way, it is achieved that it is possible to make a large variety of quantities of beverage without a need of using another beverage making device 1, wherein a range of possible quantities may run from one cup to an entire jug. Furthermore, it is not necessary for the beverage making device 1 to have more than one system for conducting and pumping fluid through the beverage making device 1. Also, when the beverage making device 1 is suitable for making a cool or hot beverage, it is not necessary to have additional means for performing a cooling or heating function.

It is noted that according to an aspect of the present invention, a set of articles is provided, which articles are suitable to be used in a process of making a beverage by conducting a fluid through a beverage extract, and which set of articles comprises the following components:

a beverage making device 1 having a brewing space 5 for at least partially receiving and accommodating a device 9, 21, 22 for holding a quantity of beverage extract, and a system for conducting and pumping fluid through the beverage making device 1; and a number of devices 9, 21, 22 for holding a quantity of beverage extract, wherein each of the devices 9, 21, 22 is suitable to be at least partially arranged in the brewing space 5 of the beverage making device 1, and wherein at least one of the devices 9, 21, 22 is so large that only a part of the device 21 fits in the brewing space 5.

Each of the devices 9, 21, 22 has a space 10, 23 for receiving and accommodating a quantity of beverage extract, and it may particularly be so that the space 23 of the relatively large device 21 is larger than the brewing space 5.

Preferably, in case the beverage making device 1 comprises closure means such as a hingeably arranged lid 3 for closing an open side of the brewing space 5, all of the devices 9, 21, 22 are suitable to be covered by the lid 3, wherein the relatively large device 21 is suitable to be covered by the lid 3 in another hinged position than a position for closing the open side of the brewing space 5.

The relatively large device 21 may comprise at least one filter element 25, 26 which is adapted to retain beverage extract while allowing fluid to pass. An arrangement in which the relatively large device 21 has a single filter element 26, and in which another filter element 25 is arranged in the closure means 3 of the beverage making device 1 is feasible within the scope of the present invention.

The invention claimed is:

1. A set of articles suitable to be used in a process of making a beverage by conducting a fluid through a beverage extract, comprising:
    a beverage making device having a brewing space for at least partially receiving and accommodating a device for holding a quantity of beverage extract, and a single system for conducting and pumping fluid through the beverage making device; and
    a number of devices for holding a quantity of beverage extract, wherein the number of devices comprise (i) at least one pad holder having a relatively shallow space, wherein the relatively shallow space is suitable for receiving and supporting at least one pad that comprises a filter envelope and contains a quantity of beverage extract suitable for making one or two cups of the beverage in one operation cycle, and wherein the at least one pad holder is arranged to fit entirely in the brewing space of the beverage making device, and (ii) at least one first and second brewing unit having a space suitable for receiving and accommodating a quantity of beverage extract in a loose form, wherein the first brewing unit accommodates a quantity of beverage extract suitable for making six to eight cups of the beverage in one operation cycle and the second brewing unit accommodates a quantity of beverage extract suitable for making fourteen to sixteen cups of the beverage in one operation cycle, wherein the first and second brewing units each comprise at least one filter element, wherein first brewing unit is arranged to fit entirely in the brewing space of the beverage making device and the second brewing unit is arranged to fit only partially in the brewing space of the beverage making device, and further wherein the space of the second brewing unit is larger than the space of the at least one pad holder and the space of the first brewing unit for enabling the second brewing unit to be used in a process of making a considerably larger quantity of beverage than may be obtained by using the pad holder or the first brewing unit, in one operation cycle using the beverage making device,
    wherein the brewing space of the beverage making device is accessible through an open side, wherein closure means are provided which are capable of assuming a position for closing the open side of the brewing space, and wherein both the at least one pad holder and the first and second brewing units are suitable to be covered by the closure means of the beverage making device,
    wherein the closure means of the beverage making device comprise a hingeably arranged lid, and
    wherein the second brewing unit is so large that (i) the space of the second brewing unit is larger than the brewing space of the beverage making device and (ii) only a bottom part of the second brewing unit is arranged to fit in the brewing space of the beverage making device and a top part of the second brewing unit is arranged to fit between a top side of a base part of the beverage making device and the lid, and wherein the second brewing unit is arranged to be covered by the lid in a hinged position other than a hinged position of the lid for closing the open side of the brewing space of the beverage making device when using the pad holder or the first brewing unit.

2. The set of articles according to claim 1, wherein the at least one brewing unit comprises a single filter element, and wherein another filter element is arranged in the closure means of the beverage making device.

3. The set of articles according to claim 1, wherein the beverage making device is equipped with means for controlling the operation of the system for conducting and pumping fluid through the beverage making device, and means for detecting a type of the device for holding a quantity of beverage extract in response to such a device being placed in the beverage making device, wherein the detecting means detects whether a pad holder or a brewing unit is placed in the beverage making device, wherein further the detecting means are adapted to transmit information to the controlling means regarding the type of device for holding a quantity of beverage extract.

4. The set of articles according to claim 3, further wherein each type of device for holding a quantity of beverage extract comprises a device for holding one of two different quantities of beverage extract, and wherein the beverage making device is equipped with two different elements to be operated by a user, wherein one element is arranged in a system for supplying a first signal to the controlling means, and wherein another element is arranged in a system for supplying a second signal to the controlling means, wherein the first signal is associated with a first quantity of fluid to be used in a beverage making process, wherein the second signal is associated with a second quantity of fluid to be used in a beverage making process, and wherein the first quantity and the second quantity are different quantities.

5. The set of articles according to claim 1, wherein the beverage making device is equipped with means for controlling the operation of the system for conducting and pumping fluid through the beverage making device, and valve means which are controllable by the controlling means, wherein the valve means are adapted to let in air to the brewing space of the beverage making device for taking a pressure prevailing inside the brewing space to an ambient pressure level and rendering it easier for a user to put the hingeably arranged lid in an opened position.

6. The set of articles according to claim 1, further comprising two tanks for containing a fluid to be used in a process of making a beverage, wherein the beverage making device has an area for receiving one of the tanks, and wherein the tanks are of different size.

7. A brewing unit suitable to be at least partly arranged in a brewing space of a beverage making device, the brewing unit comprising:

a space suitable for receiving and accommodating a quantity of beverage extract in a loose form suitable for making fourteen to sixteen cups of the beverage in one operation, at least one filter element suitable to be covered by closure means of the beverage making device, wherein the closure means is adapted for closing an open side of the brewing space of the beverage making device, and means for engaging with a portion of the closure means of the beverage making device, wherein the space of the brewing unit is larger than a space of at least one pad holder for enabling the brewing unit to be used in a process of making a considerably larger quantity of beverage than may be obtained by using the pad holder in one operation cycle using the beverage making device, wherein the brewing space of the beverage making device is accessible through an open side, wherein the closure means are capable of assuming a position for closing the open side of the brewing space, and wherein both the at least one pad holder and the brewing unit are suitable to be covered by the closure means of the beverage making device, wherein the closure means of the beverage making device comprise a hingeably arranged lid, and wherein the brewing unit is so large that (i) the space of the brewing unit is larger than the brewing space of the beverage making device and (ii) only a bottom part of the brewing unit is arranged to fit in the brewing space of the beverage making device and a top of the brewing unit is arranged to fit between a top side of a base part of the beverage making device and the lid, and wherein the brewing unit is arranged to be covered by the lid in a hinged position other than a hinged position of the lid for closing the open side of the brewing space of the beverage making device when using the pad holder.

\* \* \* \* \*